United States Patent
Miyamura et al.

(10) Patent No.: US 10,467,146 B1
(45) Date of Patent: Nov. 5, 2019

(54) TAPE DRIVE WITH INTELLIGENT SELECTION OF WRAP / TRACK FOR TEMPORARILY STORING FLUSHED DATA

(71) Applicant: International Business Machines Corporation, Armonk, NY (US)

(72) Inventors: Tsuyoshi Miyamura, Yokohama (JP); Eiji Ogura, Yokohama (JP); Tomoko Taketomi, Shinagawa-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/968,805

(22) Filed: May 2, 2018

(51) Int. Cl.
  *G06F 12/08* (2016.01)
  *G06F 12/0891* (2016.01)
  *G11B 5/008* (2006.01)
  *G06F 12/0868* (2016.01)

(52) U.S. Cl.
  CPC ...... *G06F 12/0891* (2013.01); *G06F 12/0868* (2013.01); *G11B 5/00817* (2013.01); *G06F 2212/213* (2013.01); *G06F 2212/70* (2013.01)

(58) Field of Classification Search
  None
  See application file for complete search history.

(56) References Cited

U.S. PATENT DOCUMENTS

| | | | |
|---|---|---|---|
| 6,970,311 B2 | 11/2005 | Jaquette | |
| 7,119,974 B2 | 10/2006 | Jaquette | |
| 7,350,021 B2 | 3/2008 | Itagaki | |
| 7,496,539 B1 | 2/2009 | Bai | |
| 8,035,912 B2 | 10/2011 | Katagiri | |
| 8,964,327 B2 | 2/2015 | Abe | |
| 2013/0155540 A1 | 6/2013 | Katagiri | |
| 2015/0277777 A1 | 10/2015 | Karp | |

FOREIGN PATENT DOCUMENTS

| | | |
|---|---|---|
| JP | 2007095231 B1 | 4/2007 |
| JP | 2009289349 B2 | 12/2009 |
| JP | 2013125566 B2 | 6/2013 |

OTHER PUBLICATIONS

Karp, Jim, "IBM TS1140 Tape Drive—Technology, Features and Function Whitepaper", IBM Systems Storage™, Oct. 2011, 44 pages.

*Primary Examiner* — Kevin Vernbrugge
(74) *Attorney, Agent, or Firm* — Andrew Aubert

(57) ABSTRACT

A tape drive that can select one or more wraps from any available wraps on a tape medium for writing temporary data upon detecting a flush condition. The one or more wraps selected for writing temporary data can be selected from wraps otherwise reserved for normal writing operations. Selection of the one or more wraps for temporary writing may be based on multiple considerations, including proximity to the wrap of current data writing operations and tape medium degradation. The one or more wraps selected for writing temporary data may be selected with or without regard of their assigned read/write direction. Assigning wraps based on proximity and/or degradation can lead to certain operational advantages including reducing tape write head movement in the transverse direction and spreading tape medium wear more evenly across the surface of the tape medium.

20 Claims, 10 Drawing Sheets

TAPE DRIVE WITH INTELLIGENT SELECTION OF WRAP / TRACK FOR TEMPORARILY STORING FLUSHED DATA

BACKGROUND

The present invention relates generally to the field of tape drives, and more particularly to tape drives that store data on a tape medium by intermittently "flushing" (that is, communicating data from a buffer memory to the tape medium).

It is known to write computer data on tape mediums by tape drives so that: (i) there are multiple, parallel longitudinally oriented tracks running along the length of the tape medium (for example, across the entire length of the tape medium, or across a substantial portion of the length of the tape medium); and (ii) each track has sequentially stored data (for example, a series of stored computer files). Some known tape drives only write to/read from a single track at a time. In some of these multiple, parallel track type tape drive systems, when the buffer memory is flushed, then at least some of the data in the buffer may need to be stored at temporary locations on the tape until it is determined where the data will be "permanently stored" (that is, stored until it is desired to delete or move the data for some reason unrelated to flushing the buffer). (See definitions of "permanent" and "temporary," below, in the Definitions section of this document.) For example, if the buffer memory contains portions of several different larger data streams or segments of data streams, then these portions are stored temporarily on the tape during the flush operation, and, when there is a convenient time, read from the tape and re-stored on the tape medium so that each data stream or segments of a data stream is re-assembled from its temporarily stored pieces and permanently stored so that each data stream or segments of a data stream is stored in a continuous (or at least relatively continuous) manner.

In tape drives, forward direction tracks or "wraps" (that is, tracks intended to generally have data sequentially written on them in a first longitudinal direction) alternate with reverse direction wraps (that is, tracks intended to generally have data sequentially written on them in a second longitudinal direction that is the reverse of the first direction). This alternation of forward and backward direction tracks tends to reduce seek time in normal read/write operations of the tape drive. For example, if the end of a track is reached in the middle of sequential data for a data stream or segments of a data stream, then that data stream or segments of a data stream can be continued to be stored on a reverse track that begins at the same longitudinal end of the tape medium where the recording was interrupted by virtue of the fact that the end of the forward direction track was reached. There are 4 data bands on the tape. On each data band, data is written as described in this section. Even more specifically, in typical type tape drive systems, a data stream or segments of a data stream that is being written to the outermost forward direction wrap (that is along one transverse edge of a data band on the tape medium) will be continued along the outermost reverse direction wrap running along the opposite transverse edge of a data band on the tape medium. In these embodiments, the storage of permanently stored data proceeds wrap by wrap from the transverse edges of a data band on the tape medium (or a given data band of a multiple data band tape medium) towards the center of a data band on the tape medium (or a given data band of a multiple data band tape medium).

One known type of multiple, parallel track tape drive system that temporarily stores pieces of data for later is called recursive accumulating backhitchless flush (RABF) type tape drive system. To explain RABF in more detail, in a typical RABF operation, a controller of the tape drive first writes data in a buffer. The tape drive receives a synchronization request and the tape drive writes the data from the buffer to a temporary recording area on the tape, with the tape continuously traveling. Simultaneously, the controller recursively accumulates data in the buffer and writes back the data to a normal recording area when either the buffer or the temporary recording area becomes full. Therefore, an RABF synchronization does not need a backhitch for subsequent synchronizations and the time required for synchronization can be reduced. Typically, an RABF controller detects a pattern of synchronizing events for received data records to be written to tape. The RABF controller writes each transaction data records to the magnetic tape, accumulates the synchronized transactions in a buffer, and subsequently recursively writes the accumulated transactions of data records from the buffer to the tape in a sequence. A single backhitch may be employed to place the recursively written accumulated data records following the preceding data. This recursive writing operation may also be known as a "flush."

In typical RABF type tape drive systems, when there is a synchronization operation (that is, data from the buffer is temporarily stored at a temporary location on the magnetic tape until the various data stream or segments of a data stream can be assembled in their "permanent" order), data corresponding to pieces of various data stream or segments of a data stream are typically temporarily stored in a static manner at the innermost wraps of a data band currently being recorded to, as will be discussed in more detail, below.

File is a concept of a file system. When an application program running on the server writes a file to a storage device, the file is divided into multiple blocks with a certain size. A storage device receives by a unit of block (or record) per every write command. In the case of a tape drive, it compresses the records into a small piece and packs it on to the memory buffer (segment buffer). Once the packed size reaches a certain size, the chunk is called a data set which is the minimum unit to read/write to the tape medium. One of the triggers for the drive to flush the data sets on the buffer to the tape is when the number of data sets exceeds a certain number.

The following is a brief explanation of how RABF works. On a segment buffer, each data set is called a segment. During normal operations, the drive writes data on the original wrap. Once an RABF trigger occurs, the drive moves the recording head to the ABF wrap. The drive writes data sent from the host to the tape on the ABF wrap even though the size is smaller than a data set. Once the next data is sent, the drive appends the data next to the last end of the previous data on a segment, then writes the segment to the tape. Once the size of the accumulated exceeds the size of a data set (a segment), the tape drive proceeds to the next segment. Here a segment is written to the tape as a data set, but the segment is kept in the buffer. This operation is called as an "accumulating backhitchless flush". Once half of the segments in the buffer are filled with data segments, the drive positions the recording head over the second ABF wrap and reverses direction. When the segment buffer is nearly full, the drive terminates the accumulation mode and moves the recording head back to the original wrap. The drive flushes the segments in the buffer to the tape on the original wrap. In this case, the drive does not read back the data from the tape but uses the segments accumulated in the buffer. This operation is called as a "recursive writing".

RABF operations allows the tape to keep running on the tape drive while the host sends data to the drive. During normal Non-RABF tape drive operations, when the drive flushes the whole data to the tape intentionally by writing a file mark, the buffer is empty. The host sends the subsequent data to the tape drive, but it takes some time until several segments are filled. Once several segments are filled in the buffer, the drive starts writing data to the tape. While the buffer was accumulating segments of data from the host, the tape drive kept the tape moving and the tape position is precisely adjacent to the previous data segment. To avoid leaving unused gaps of data storage space on the tape medium, the tape drive backhitches the recording head/tape medium position to the precisely adjacent tape position to the previous data segment. RABF assists in avoiding unused tape medium data storage while reducing the frequency of backhitches by moving the recording head over the ABF wrap on the tape to continue writing while data accumulates in the buffer, because the drive cannot return the READY status to the host. Once the READY status is returned, the host can send the subsequent data to tape drive buffer.

SUMMARY

According to an aspect of the present invention, there is a method, computer program product and/or system for use with a tape drive system including a buffer memory, tape drive control logic, a tape recording head for writing to-be-written data and an elongated tape medium defining a transverse direction, with the tape medium being organized into a plurality of writing tracks adapted to have recorded thereon to-be-written data as written data. The method performs the following operations (not necessarily in the following order): (i) receiving, by a buffer memory, a stream of to-be-written data; (ii) receiving, by the tape drive control logic, an identity of a first writing track of the plurality of writing tracks, with the first writing track being a track where to-be-written data is currently being permanently written as written data from the buffer memory to the tape medium by the tape recording head; (iii) receiving, by the tape drive control logic, flush indication data indicating that a flush of the buffer memory needs to be performed; (iv) responsive to the receipt of the buffer flush indication data, determining a second writing track of the plurality of writing tracks, with the second writing track being a writing track to be used in flushing to-be-written data from the buffer memory, and with the determination of the second writing being based, at least in part, upon a relative transverse direction proximity between the first writing track and the second writing track; and (v) flushing at least a portion of the buffer memory by writing to-be-written data from the buffer memory as temporary written data to the second writing track.

According to an aspect of the present invention, there is a method, computer program product and/or system for use with a tape drive system including a buffer memory, tape drive control logic, a tape recording head for writing to-be-written data and an elongated tape medium defining a transverse direction, with the tape medium being organized into a plurality of writing tracks adapted to have recorded thereon to-be-written data as written data. The method performs the following operations (not necessarily in the following order): (i) receiving, by a buffer memory, a stream of to-be-written data; (ii) receiving, by the tape drive control logic, an identity of a first writing track of the plurality of writing tracks, with the first writing track being a track where to-be-written data is currently being permanently written as written data from the buffer memory to the tape medium by the tape recording head; (iii) receiving, by the tape drive control logic, flush indication data indicating that a flush of the buffer memory needs to be performed; (iv) responsive to the receipt of the buffer flush indication data, determining a second writing track of the plurality of writing tracks, with the second writing track being a writing track to be used in flushing to-be-written data from the buffer memory, and with the determination of the second writing being based, at least in part, upon a degree of tape degradation of the plurality of writing tracks; and (v) flushing at least a portion of the buffer memory by writing to-be-written data from the buffer memory as temporary written data to the second writing track.

According to an aspect of the present invention, there is a method, computer program product and/or system for use with a tape drive system including a buffer memory, tape drive control logic, a tape recording head for writing to-be-written data and an elongated tape medium defining a transverse direction, with the tape medium being organized into a plurality of writing tracks adapted to have recorded thereon to-be-written data as written data. The method performs the following operations (not necessarily in the following order): (i) receiving, by a buffer memory, a stream of to-be-written data; (ii) receiving, by the tape drive control logic, an identity of a first writing track of the plurality of writing tracks, with the first writing track being a track where to-be-written data is currently being permanently written as written data from the buffer memory to the tape medium by the tape recording head; (iii) receiving, by the tape drive control logic, flush indication data indicating that a flush of the buffer memory needs to be performed; (iv) responsive to the receipt of the buffer flush indication data, determining a second writing track of the plurality of writing tracks, with the second writing track being a writing track to be used in flushing to-be-written data from the buffer memory, and with the determination of the second writing being based, at least in part, upon: (a) a relative transverse direction proximity between the first writing track and the second writing track, and (b) a degree of tape degradation of the plurality of writing tracks; and (v) flushing at least a portion of the buffer memory by writing to-be-written data from the buffer memory as temporary written data to the second writing track.

DETAILED DESCRIPTION

Figure 1:
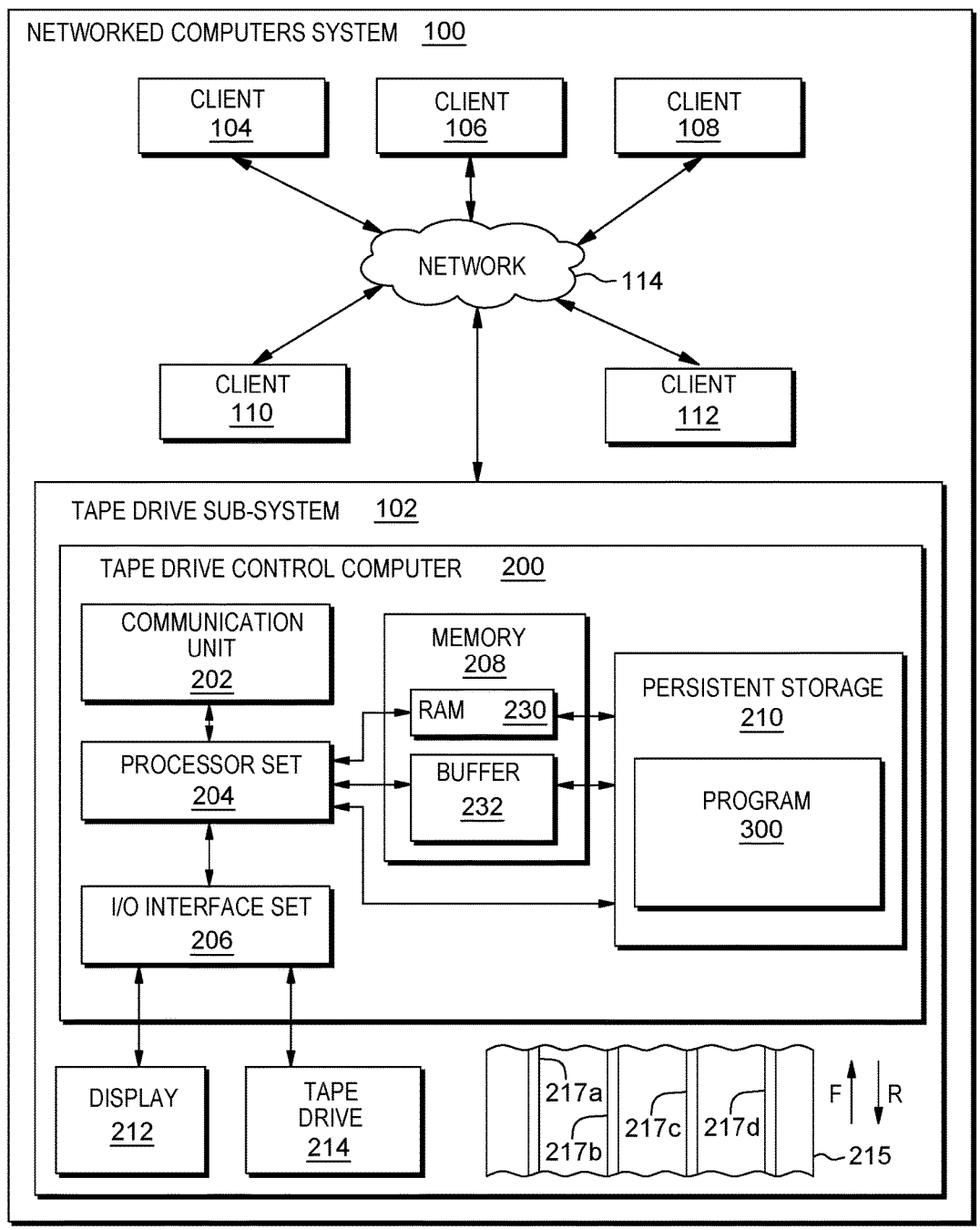
FIG. 1 is a block diagram view of a first embodiment of a system according to the present invention.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: tape drive sub-system 102; client sub-systems 104, 106, 108, 110, 112; communication network 114; tape drive control computer 200; communication unit 202; processor set 204; input/output (I/O) interface set 206; memory device 208; persistent storage device 210; display device 212; tape drive 214; random access memory (RAM) devices 230; buffer memory 232; tape medium 215 (including forward (F) direction data tracks 217a and 217c and reverse (R) direction data tracks 217b and 217d); and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to tape drive 214. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
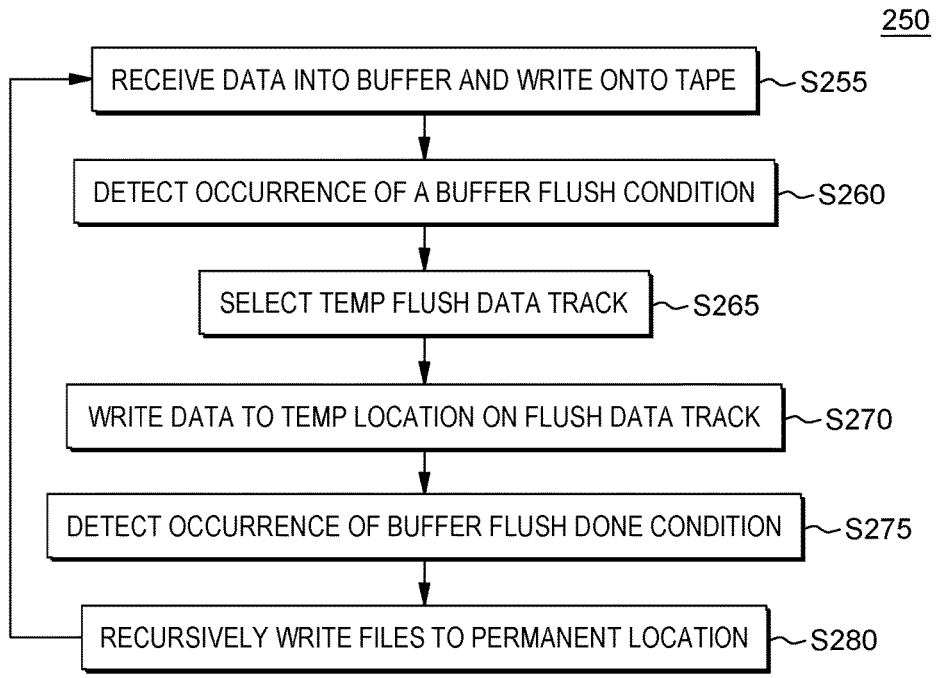
FIG. 2 is a flow chart of a first embodiment of a method according to the present invention that is performed by the first embodiment system.
Figure 3:
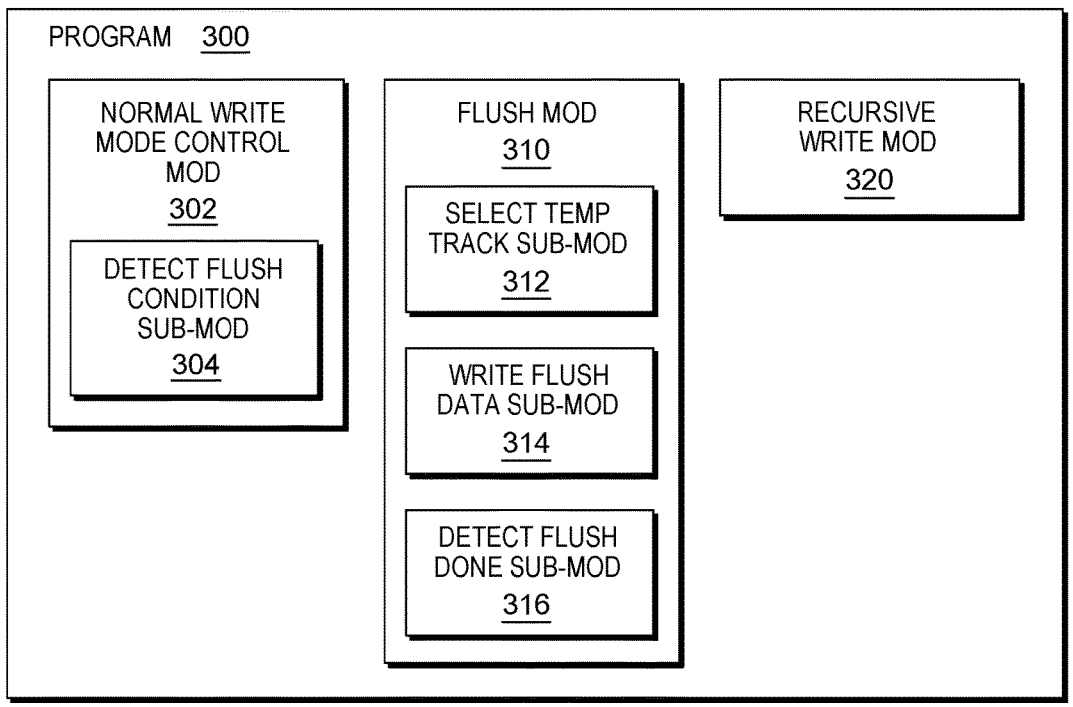
FIG. 3 is a block diagram view of a portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Figure 4:
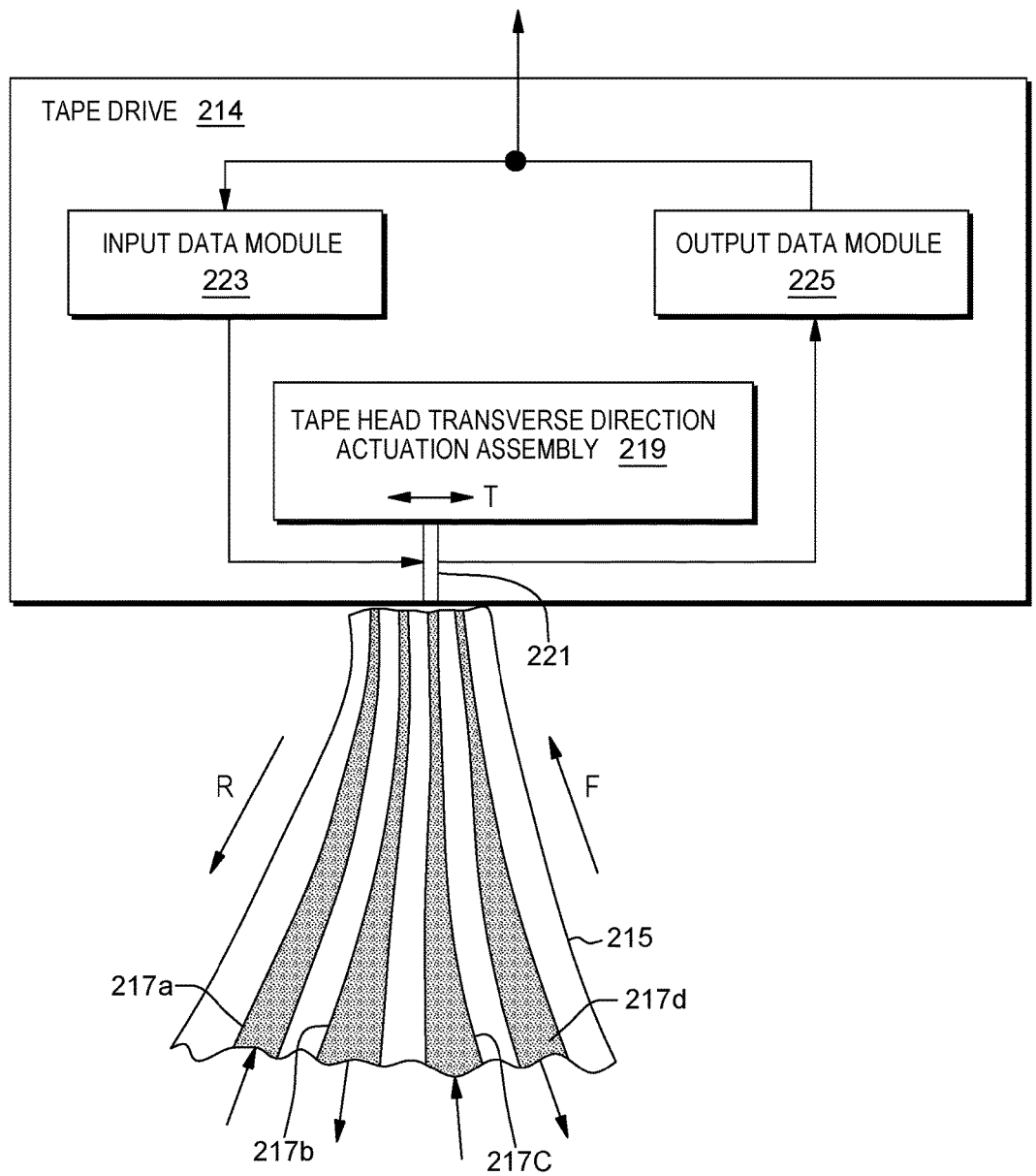
FIG. 4 is a block diagram view of another portion of the first embodiment system.

Processing begins at operation S255, where normal write mode control mod 302 controls the flow of data to be written from buffer 232 to forward direction track 217a of tape medium 215 through input data module 223 and read/write head 221 of tape drive 214 (see FIG. 4). As further shown in FIG. 4, tape drive 214 also includes tape head transverse direction actuation assembly 219 and output data module 225. During this normal mode of operation assembly 219 positions head 221 in the transverse direction so that it is over forward direction track 217a. In this embodiment, head 221 is narrower, in the transverse direction, than the transverse width allotted on the tape medium for each data track 217a, b, c, d, so there is no concern about cross-talk between adjacent data tracks. As will be discussed in detail in the next sub-section of this Detailed Description section, some embodiments of the present invention use guard bands, internal buffer zones and the like to prevent the possibility of cross talk when the transverse dimension of the head is wider than a data track (or "wrap").

During the normal mode of operations of operation S255, data is flowing through the buffer relatively slowly, such that: (i) there is no risk that the buffer will overflow; and (ii) each data stream or segments of a data stream to be stored as computer data on track 217a is received in a continuous manner from beginning to end. Therefore, during operation S255, there is no need for a buffer flush as data stream or segments of a data stream are received and written to tape. This normal operation writing is "permanent" (see definition, below, in the Definitions sub-section) and puts data at a "permanent location."

In some preferred embodiments of the present invention, data is written in a manner that will be discussed in the next sub-section in connection with FIG. 5. More specifically, there are numbers on the right side of FIG. 5, and in these preferred embodiments, the drive writes data on the tape by the order. However, in order to vividly demonstrate the broad potential scope of the present invention, this sub-section will discuss a very different embodiment of the present invention—one that is somewhat simpler than currently conventional, commercially popular RABF type tape drives. This simplified embodiment can help the reader understand some of the unifying inventive concepts that may run across a wide range of tape drive embodiments, whether or not similar to currently conventional technology.

Because track 217a is a forward direction track, data is written in the F direction (see FIGS. 1 and 4) during normal operations. If track 217a were full of data, this embodiment would begin writing to track 217b in reverse direction R (because track 217b is a reverse direction track). In this embodiment, the normal operation permanent writing proceeds from track 217a to track 217b to track 217c. In this embodiment, track 217d never stores data at its permanent location, but, rather, is reserved for other uses, such as temporary storage of flushed data and metadata regarding a file system structure that is a hierarchical organizing construct for the various files stored on the tape medium. Alternatively, many other numbers of tracks, allocation of tracks, directionality of tracks and/or writing order of tracks are possible, as will be discussed in detail in the following sub-section. As a further alternative, all wraps can be used to write permanent data. More specifically, ABF wraps can be used to write temporary data initially but at the end (when all wraps other than these wraps were written), RABF mechanism is disabled and writes permanent data on them.

Processing proceeds to operation S260, where detect flush condition sub-module 304 detects that a buffer flush condition has occurred. In this embodiment, there are two buffer flush conditions as follows: (i) the buffer is at least 80% full of data; or (ii) before a given data stream or segments of a data stream is finished being received and written to its permanent location, data from another data stream or segments of a data stream begins to emerge from the buffer (specifically, a first in first out buffer in this embodiment). In various embodiments of the present invention, other buffer flush conditions are possible, such as: (i) file mark is written; (ii) a certain time elapsed after writing last data; (iii) the drive enters power saving mode; (iv) rewind/unload the tape; and/or (v) locate/reposition to a different position.

Processing proceeds to operation S265, where select temporary track sub-module 312 of flush module 310 selects a temporary track to which to store the data that is about to be flushed from the buffer in a relatively uninterrupted manner. In this embodiment, the machine logic governing this selection considers two factors: (i) how heavily the various tracks have been used in the past (which is a form of considered degree of tape degradation); and (ii) transverse direction proximity to the track that was being permanently written to when normal operations were interrupted by the detection of the flush condition. These two factors will be discussed in more detail in the following two paragraphs. Before proceeding with that discussion, it is noted that other embodiments of the present invention may additionally consider other factors, such as track directionality, the possibility of cross talk, etc. For example, as will be discussed in the following sub-section, currently conventional RABF type tape drives already consider these other factors, and, in some embodiments, these factors may continue to be considered in conjunction with the tape degradation factor and/or the transverse proximity factor.

TAPE DEGRADATION FACTOR: Magnetic tape wears out. This means that if the same track is always, or at least relatively frequently, used for repeated buffer flushes over time, then the portion of the tape where this track resides may wear out more quickly than the rest of the tape medium, potentially causing data loss and/or the need to replace a tape medium. Therefore, this embodiment of the present invention considers tape degradation each time a buffer flush is to be performed. More specifically, in this embodiment, select temporary track sub-module 312 keeps track of how many times each track has been selected for a buffer flush on an ongoing basis. Even more specifically, in this example, (i) track 217b has been used 206 times; (ii) track 217c has been used 102 times; and (iii) track 217d has been used 88 times. This means that: (i) track 217b is considered to have the highest potential for catastrophic degradation; (ii) track 217d is considered to have the lowest potential for catastrophic degradation; and (iii) track 217c has an intermediate potential for catastrophic degradation. If tape degradation were the only factor considered, then track 217d would be selected as the temporary storage track. As may be discussed in the following sub-section, there may be other ways of determining and/or estimating track degradation.

TRANSVERSE PROXIMITY: As will be appreciated by those of skill in the art, it is generally preferable if transverse direction T movement of the head is reduced or minimized. Of course, the least transverse movement would be required if track 217a were used to store the flushed data at its temporary location. However, this embodiment does not permit this because temporarily stored data would likely interfere with permanent storage of data during later recursive write operations. In this example, (i) track 217b has the closest transverse direction proximity to track 217a (the track currently being permanently written to at the time of the flush); (ii) track 217d has the least transverse direction proximity to track 217a; and (iii) track 217c has intermediate transverse direction proximity to track 217a. This means that: (i) track 217b is considered most favorable from a transverse proximity perspective; (ii) track 217d is considered least favorable from a transverse proximity perspective; and (iii) track 217c has intermediate favorability from a transverse proximity perspective. If transverse proximity were the only factor considered, then track 217b would be selected as the temporary storage track.

BALANCING THE FACTORS: As mentioned above, various embodiments may consider different factors in selecting a temporary track by machine logic. Embodiments that consider multiple factors must balance the factors in some way, and there are many and various ways of doing this. In the particular embodiment under discussion, each track is assigned a score equal to 100 times the number of tracks away from the current track plus the number of previous uses as a temporary track. According to this formula: (i) track 217b has a score of 306; track 217c has a score of 302; and (iii) track 217d has a score of 388. After the tracks are scored, the eligible track (that is, in this example, tracks other than 217a) with the lowest score is selected by sub-module 312 as the track to store temporary data pursuant to the flush operation.

Processing proceeds to operation S270 where: (i) tape head transverse direction actuation assembly moves head 221 in the transverse direction from the track 217a position to the track 217c position (see FIG. 4); and (ii) write flush data sub-module 314 controls a flush of data in buffer 232 (see FIG. 1) to selected track 217c through input data module 223 and head 221. In this embodiment, the flush data is recorded in the same direction as the operation direction at the time the flush began (in this example, the forward direction) regardless of the directionality of the track. This means, for example, that if track 217b had been selected, then the flushed data would be written in the F direction despite the fact that track 217b is an R direction track. Alternatively, and as may be further discussed in the following sub-section, directionality of temporary writing pursuant to a flush operation may be handled in different ways.

Processing proceeds to operation S275, where detect flush done sub-module 316 of flush module 310 determines that the buffer flush is complete and all flushed data has been stored to its temporary location on selected track 217c.

Processing proceeds to operation S280, where recursive write module 320 controls permanent writing of the data that was previously temporarily written during the buffer flush of operation S270.

III. Further Comments and/or Embodiments

Some embodiments of the present invention are applicable to an RABF type tape drive system. Certain operations of an RABF tape drive system will be discussed in the following paragraphs.

RABF tape drives typically have a buffer for temporarily storing data internally. The buffer is provided to absorb the difference in the transfer rates between the tape drive and a host. When a predetermined amount of data has been accumulated, the accumulated data is taken out of the buffer and written to a tape. When the buffer becomes empty, the writing operation to the tape is halted to wait for the next data to be transferred. At this point, as the tape continues to run, double reversal of direction in a tape resulting from a tape unavoidably moving past the desired stopping point, which is called "backhitch," occurs before the next writing operation takes place, and the tape is wound back so that the head is repositioned with respect to the last location of the data that was most recently written, where the writing operation will be started. Backhitches take time to perform (in some embodiments, backhitch time is estimated to be about five seconds). For example, if the writing throughput of the tape drive is 300 MB/sec, then the writing data to the tape will be delayed during this time by the amount of 1.5 GB. As a consequence, the size of the buffer is enlarged or the running speed of the tape is adjusted as a countermeasure against this phenomenon to minimize the occurrence of backhitch.

In order to reduce backhitches, and associated slowdown of the write transfer rate, RABF type tape drives use an algorithm known as recursive accumulating backhitchless flush (RABF). During a buffer flush in a typical RABF type tape drive: (i) at first, data from a first data stream or segments of a data stream is written to a wrap where it will be "permanently" stored (see, discussion, above, in Background section regarding the meaning of the word "permanent" in this context); (ii) before all of the data of the first data stream or segments of a data stream is flushed, data from a second data stream or segments of a data stream begins to be flushed from the buffer (that is a first-in, first-out buffer); (iii) the data from the second data stream or segments of a data stream is not recorded on the same wrap as data from the first data stream or segments of a data stream; (iv) instead, data from the second data stream or segments of a data stream is temporarily stored at another wrap; and (v) when the RABF tape drive has an idle period it will read the various pieces of the second data stream or segments of a data stream from the temporary location (which is called an ABF wrap) and store them in a contiguous manner at a "permanent" location on the tape medium.

During the flush operation, the longitudinal direction travel of the tape relative to the tape head is not stopped. Rather, the tape head is moved in the transverse direction so that the ABF wrap is written, too. To put it a different way, when switching from writing data of the first data stream or segments of a data stream at its permanent location to writing pieces of data from other data stream or segments of a data stream(s) on the ABF wrap, the data is written: (i) in a fairly continuous manner with respect to the longitudinal direction; but (ii) the ABF wrap is spaced apart, in the transverse direction, from the wrap being used to write the first data stream or segments of a data stream in its "permanent" location. Because the RABF flush operation does not require stopping or reversing the longitudinal direction of the tape, the flush operation can be performed relatively quickly, which can be important when the RABF type tape drive is busy in the sense that many pieces of many data stream or segments of a data stream are being continuously fed into the buffer. The quicker the buffer flush operation, the lower the probability that a given size FIFO buffer will overflow and cause an error. When the system is idle, then pieces of a given data stream or segments of a data stream on the ABF wrap can be read from the tape into the buffer, and then can be rewritten to the tape at the "permanent" location (usually some wrap other than the ABF wrap) for the data stream or segments of a data stream in a manner that requires relatively infrequent starting/stopping/reversing the longitudinal motion of the tape.

The layout of tracks (called "wraps") on an RABF formatted tape medium is relatively complex, and it can cause the logic used to dynamically select a best wrap for ABF recording, based on a given status of operations and/or head wear, to become correspondingly more complex. An RABF embodiment of the present invention will now be explained in detail starting with the format/geometry of wraps on an RABF tape medium 500 shown in FIG. 5.

Figure 5:
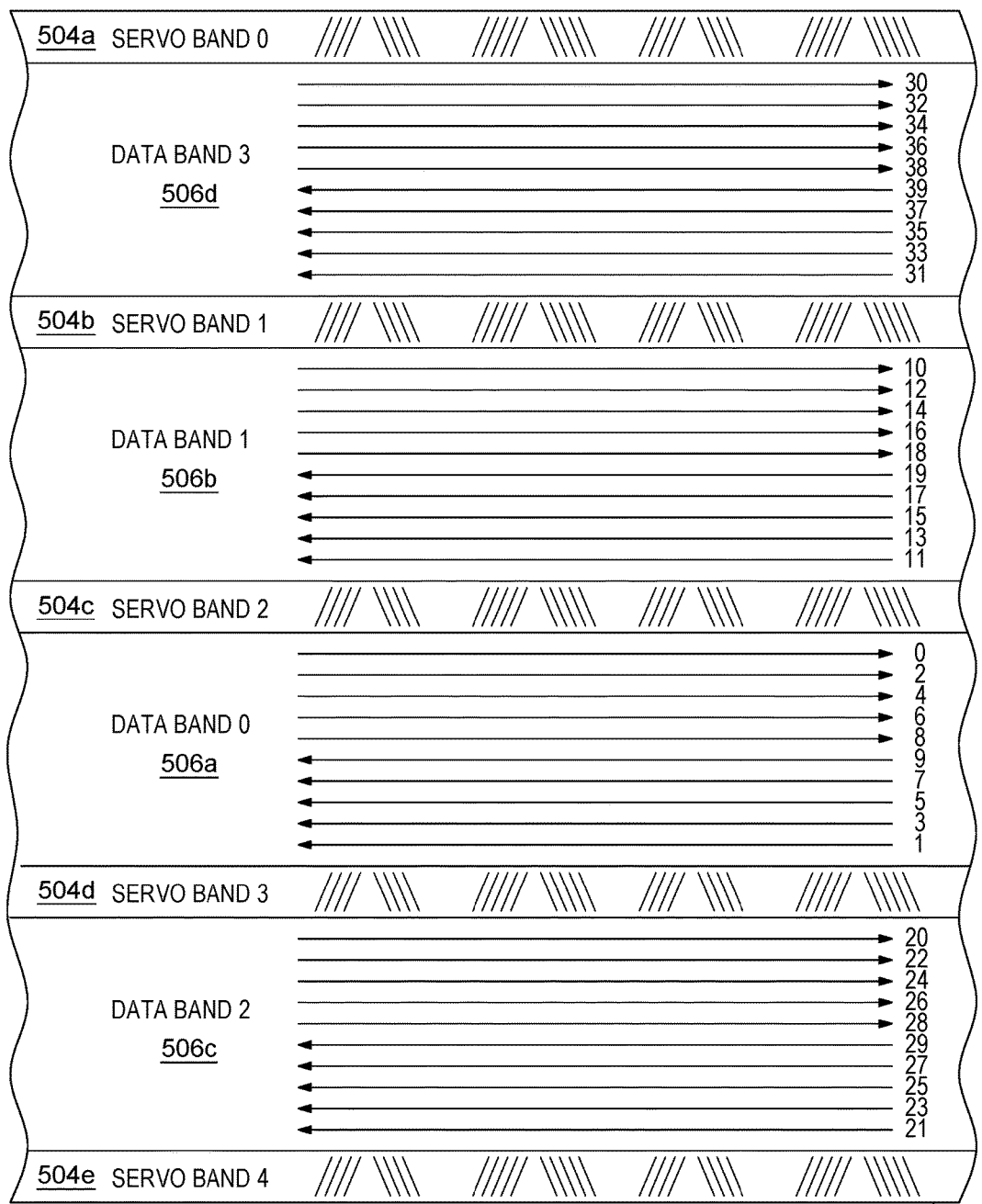
FIG. 5 is a diagram view of a tape medium suitable for use in various embodiments of the present invention.

As shown in FIG. 5, tape medium 500 includes: physical tape medium 502; servo band 0 504a; data band 0 506a (including, in top to bottom order, wraps 0, 2, 4, 6, 8, 9, 7, 5, 3, 1 (not separately numbered in FIG. 5 for clarity of illustration reasons)); servo band 1 504b; data band 1 506b (including, in top to bottom order, wraps 10, 12, 14, 16, 18, 19, 17, 15, 13, 11 (not separately numbered in FIG. 5 for clarity of illustration reasons)); servo band 2 504c; data band 2 506c (including, in top to bottom order, wraps 20, 22, 24, 26, 28, 29, 27, 25, 23, 21 (not separately numbered in FIG. 5 for clarity of illustration reasons)); servo band 3 504d; data band 3 506d (including, in top to bottom order, wraps 30, 32, 34, 36, 38, 39, 37, 35, 33, 31 (not separately numbered in FIG. 5 for clarity of illustration reasons)); and servo band 4 504e.

In this embodiment, "permanent" recording of data stream or segments of a data stream: (i) begins at wrap 0 of data band 0 in the direction shown by the uppermost arrow of data band 0; (ii) when the end of wrap 0 is reached, proceeds to wrap 1 of data band 0 in the direction shown by the lowermost arrow of data band 0; (iii) when the end of wrap 1 is reached, proceeds to wrap 2 of data band 0 in the direction shown by the second from the top arrow of data band 0; and (iv) proceeds in like manner until the end of data band 0 (that is, the end of wrap 9 of data band 0) is reached. When the end of data band 0 is reached, then "permanent" recording proceeds in a like manner on data band 1. So long as data stream or segments of a data stream come in to the buffer (not shown in FIG. 5) one at a time and in sequential order within a currently-received data stream or segments of a data stream: (i) there is typically no need for a flush operation, and (ii) "permanent" recording can proceed through the end of wrap 39 of data band 3 506d when the tape medium becomes full of data and can receive no more data stream or segments of a data stream.

However, in normal operations, a data stream or segments of a data stream do not generally come in one at a time and within sequential order of the data within each data stream or segments of a data stream. This means that RABF operations will be required, where data is temporarily stored to an ABF wrap, from which ABF wrap that data can later be re-read from the tape medium and re-written to its "permanent" location, where data stream or segments of a data stream are stored contiguously and in the order mentioned in the previous paragraph. In both currently conventional RABF embodiments, as well as in embodiments according to the present invention, the ABF wrap for a given flush operation must be chosen so that it does not interfere with the "permanent" recording.

As mentioned, above, in the Background section, currently conventional RABF tape drives will always choose wrap 39 as the ABF wrap because this wrap is the wrap that is furthest away from the "permanent" recording, and is therefore the least likely to interfere with the "permanent" recording. Herein, this is sometimes referred to as "static allocation of the ABF wrap" because the ABF will always be chosen to be the same wrap. In some static allocation of ABF wrap embodiments, the statically chosen wrap may be the second-to-last wrap, or the third-to-last wrap in the case that more than a single wrap might be needed for temporarily storage pending "permanent" re-assembly of the data stream or segments of a data stream in contiguous order. However, it is noted that static wrap embodiments will invariably choose the same wrap to use as the ABF wrap. Some embodiments of the present invention (herein sometimes referred to as "dynamic allocation of ABF wrap embodiments") are fundamentally different than currently conventional static allocation of ABF wrap embodiments because the choice of ABF wrap will depend upon factors such as: (i) transverse direction proximity to the wrap where the "permanent" recording has currently left off; and/or (ii) uniformity of wear across the transverse length of the tape head.

State of the art tape media include data wraps organized into data bands, separated by servo bands, such as shown in FIG. 5. In the example of FIG. 5, ten wraps per data band are illustrated for simplicity, but in practice 40 wraps exist on one single data band and 160 wraps in one single tape according to the latest format J5D.

Figure 6:
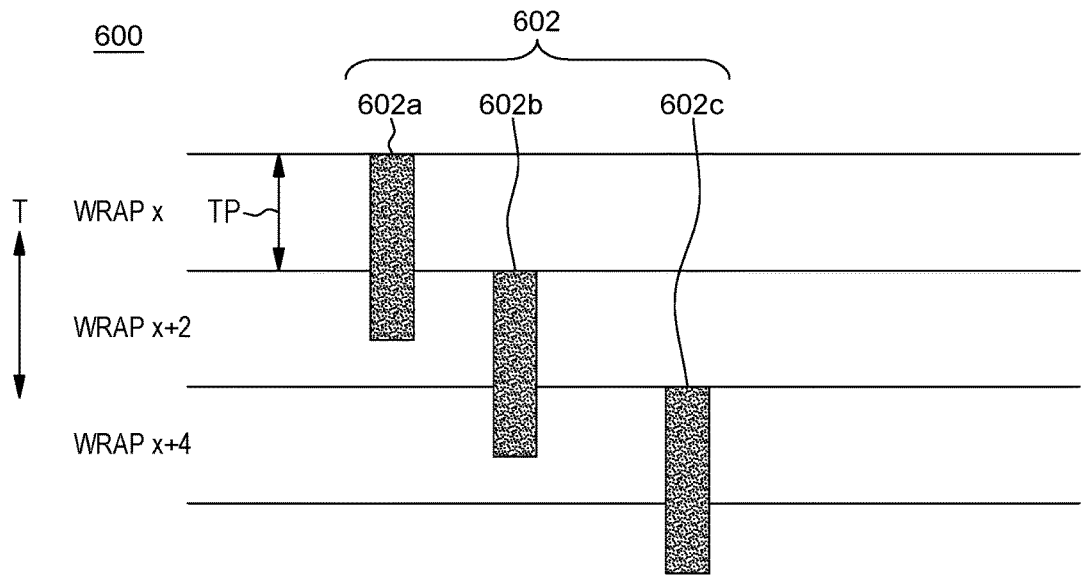
FIG. 6 is a diagram view of a tape medium and tape read/write head suitable for use in various embodiments of the present invention.

FIG. 6 shows diagram 600 which illustrates transverse direction T motion of write head 602 over time as writing operations are carried out on various wraps. More specifically, diagram 600 shows: (i) transverse position 602a of the head when writing to wrap x at time t0; (ii) transverse position 602b of the head when writing to wrap x+2 at time t1; (iii) transverse position 602c of the head when writing to wrap x+4 at time t3; and (iv) track pitch dimension TP. The tape drive carries out writing of data with a write head whose width is wider than the track pitch TP (the width of the data allocated for the wrap) as illustrated in FIG. 6, and the writing of data takes place by overwriting starting from the end of the track pitch for the writing of the next wrap. A guard wrap (not shown in FIGS. 5 and 6 for clarity of illustration purposes) is an area allocated so that the data written in the ABF wrap is not overwritten when the write back occurs by Recursive Write.

Figure 7:
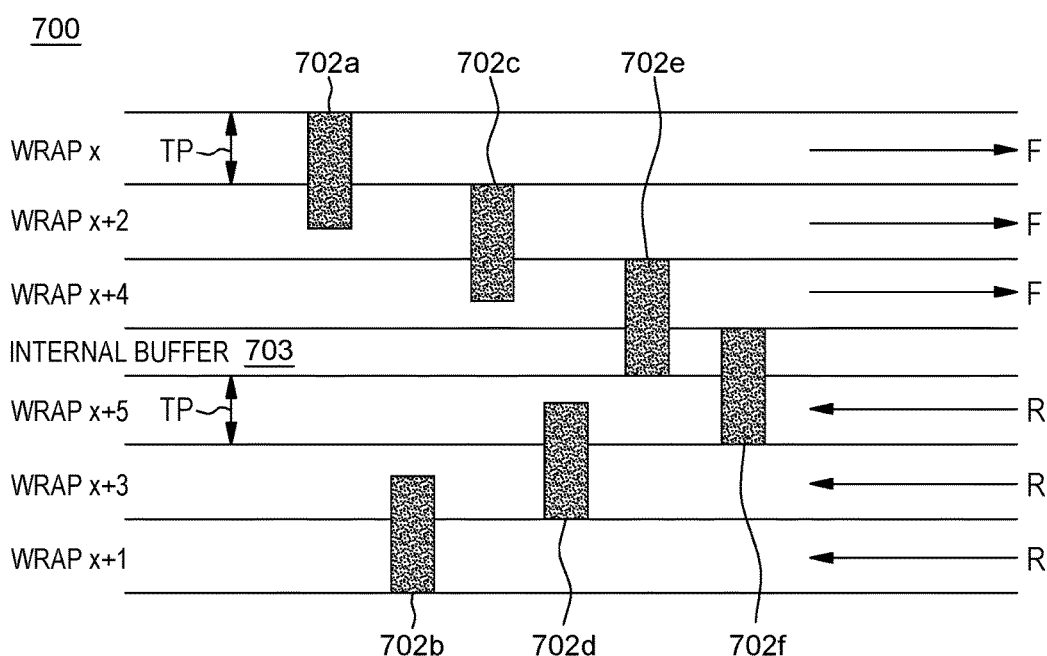
FIG. 7 is another diagram view of another tape medium and tape read/write head suitable for use in various embodiments of the present invention.

FIG. 7 shows diagram 700 which illustrates transverse direction T motion of write head 702 over time as writing operations are carried out on various wraps. FIG. 7 shows a wider range of wraps than FIG. 6 does. More specifically, diagram 700 shows: (i) transverse position 702a of the head when writing to wrap x at time t0; (ii) transverse position 702b of the head when writing to wrap x+1 at time t1; (iii) transverse position 702c of the head when writing to wrap x+2 at time t2; (iv) transverse position 702d of the head when writing to wrap x+3 at time t3; (v) transverse position 702e of the head when writing to wrap x+4 at time t4; (vi) transverse position 702f of the head when writing to wrap x+5 at time t5; and (iv) track pitch dimension TP. As shown in FIG. 7: (i) at times t0 (that is, position 702a), t2 (that is, position 702c) and t4 (that is position 702e), the writing occurs sequentially in forward direction F; and (ii) at times t1 (that is, position 702b), t3 (that is, position 702d) and t5 (that is position 7020, the writing occurs sequentially in reverse direction R.

Internal buffer 703, shown in diagram 700, is an area allocated for the same reason such that the data of the wrap X+4 (forward direction F) is not overwritten by writing of the wrap X+5 (backward direction R). Although only one guard wrap is included in this example, in practice two guard wraps may be provided depending on the relationship between the track pitch and the write head width. The following discussions assume that there is provided only one guard wrap.

In some currently convention static allocation of ABF wrap embodiments, the two wraps that are the closest to the center of a given data band (for example wraps x+4 and x+5 of diagram 700) are always selected as the ABF wraps when writing to that given data band. In some currently conventional static allocation of ABF wrap embodiments, two wraps (that is, one wrap residing on the forward direction and another wrap residing on the backward direction are allocated as the guard wraps so that overwriting by the writing of the previous wrap does not occur.

Figure 8:
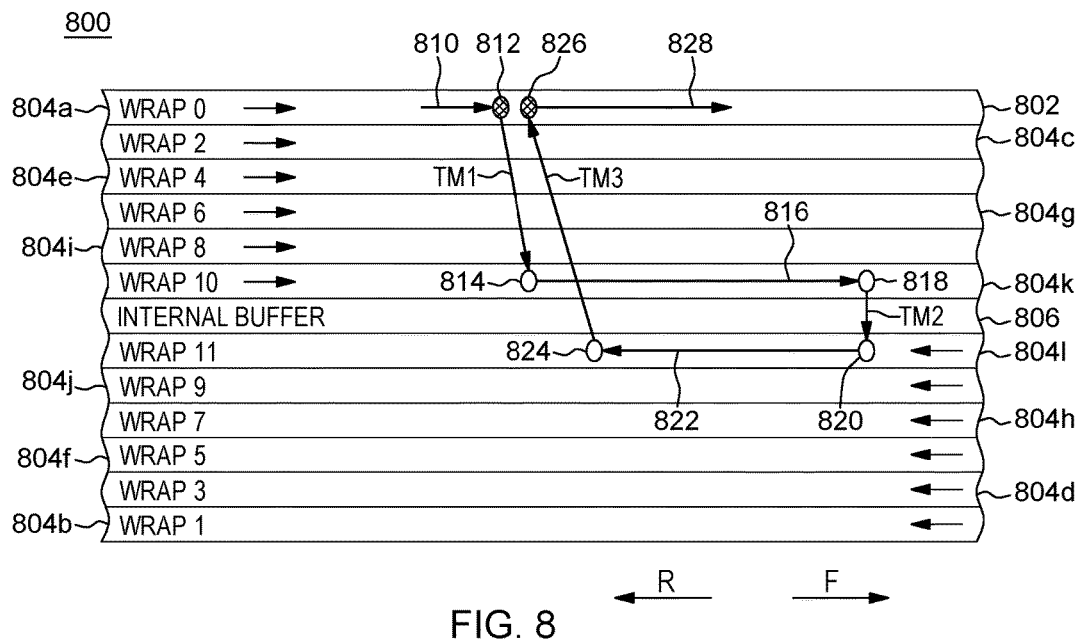
FIG. 8 is another diagram view of another tape medium suitable for use in various embodiments of the present invention.

Flushing (that is, generally involving temporary storage) and recursive saving (that is, generally involving "permanent") in a currently conventional RABF system will now be discussed in connection with FIG. 8. As shown in FIG. 8, RABF tape medium 800 includes: physical tape medium 802; six (6) forward F direction data wraps 804a, 804c, 804e, 804g, 804i, 804k; six (6) reverse R direction data wraps 804b, 804d, 804f, 804h, 804j, 804l; internal buffer zone 806; permanently stored data of first segment of first data stream or segments of a data stream 810; end point of permanently stored data of first segment of first data stream or segments of a data stream 812; first transverse head movement path TM1; start point of temporarily-stored flushed data 814; temporarily-stored flushed data segments 816 (forward direction segment and 822 (reverse direction segment); end point of forward direction flushed segment 818; second transverse head movement path TM2; start point of reverse direction flushed segment 820; end point of reverse direction flushed segment 824; third transverse head movement path TM3; start point of permanently stored data of second segment of first data stream or segments of a data stream 826; and permanently stored data of second segment of first data stream or segments of a data stream 828.

When the RABF system is idle, and its buffer is relatively empty, it can proceed to the recursive writing operation. In this recursive writing operation: (i) the second segment of the first data stream or segments of a data stream is read from its temporary location in segments 816 and/or 822 (at wraps 804k and/or 804l); (ii) the head is moved in the transverse direction as third transverse movement TM3; and (iii) the second segment of the first data stream or segments of a data stream is "recursively" written to its permanent location at segment 828 starting at start point 826. It is noted that movement TM3 of item (iii) involves a back hitch, but it is just a single backhitch that is performed when the tape drive buffer is idle.

In this conventional RABF embodiment of FIG. 8, the selection of the ABF wrap(s) is static and follows the following logic: (i) if F direction permanent writing is interrupted by temporary writing pursuant to a flush operation, then the ABF wrap, at least to begin with, is selected to be innermost F direction wrap 804k; and (ii) if R direction permanent writing is interrupted by temporary writing pursuant to a flush operation, then the ABF wrap is selected to be, at least to begin with, innermost R direction wrap 804l. In this conventional RABF tape drive, the only factors that inform the selection of the ABF band are: (i) which data band is currently being written to; and (ii) whether the tape is moving in the forward or reverse direction at the time the ABF band is selected.

Some embodiments of the present invention recognize the following facts, potential problems and/or potential areas for improvement with respect to the current state of the art: (i) when file marks are frequently written, the operation of the RABF is repeatedly performed; (ii) using a TS1150 tape drive for example, it was observed that RABF operations occurred 34 times while the writing operation to one wrap is performed, and the writing to the ABF wraps occurred every time the RABF occurred; (iii) because data having a size on the order of 2 GB (which corresponds to the buffer size is written in one round of RABF) writing of data in the amount equivalent to the capacity 64 GB per wrap are performed; (iv) the latest TS1150 tape drive has 40 wraps per one data band; (v) specifically, with regard to the wrap 38 and the wrap 39 which are the ABF wraps, a total of 37 rounds of full wrap writes occur including 36 rounds of ABF writes plus one round of normal write; (vi) further, these wraps may be used in RABF at the time of writing to the ABF wraps of another data band; (vii) when this is included, a total of 41 rounds of full wrap writes occur; meanwhile, the tape medium is thought to come to the end of the product life when about 200 Full Tape Reads/Writes occur; (viii) even when only one round or read/write is performed for a wrap that is not an ABF wrap, writing operations intensively occur to the ABF wrap, as a result of which only this wrap is extremely degraded; and/or (ix) theoretically, when five rounds of full writes are made to a tape, then the rounds of write to the ABF wrap exceed 200 rounds.

Some embodiments of the present invention recognize the following facts, potential problems and/or potential areas for improvement with respect to the current state of the art: (i) it has been specified that tape drives that are currently being developed have as many as 60 wraps per data band; (ii) accordingly, when one single full write is performed to the tape, the number of rounds of writes to the ABF wrap will exceed 60 rounds; (iii) further increase in the capacity of the tape drives is scheduled, and as a means of achieving it, in such a trend, increasing the number of the wraps cannot be avoided; (iv) in a tape drive at the very outset of introduction of RABF, the number of wraps per data band was in the order of 10 wraps, which did not cause any problem; and/or (v) however, as higher density of the wraps has been sought, the degradation of the tape due to writing to the ABF wrap should preferably be accounted for and/or countered in some way.

Some embodiments of the present invention recognize the following facts, potential problems and/or potential areas for improvement with respect to the current state of the art: (i) in the existing recursive accumulating backhitchless flush (RABF) scheme, the innermost wraps of the data band is used as the accumulating backhitchless flush (ABF) wrap; (ii) in response to the writing of a file mark occurring on the same data band, writing of data is performed for the same ABF wrap, leading to degradation of a particular wrap; (iii) since this wrap is also used as the wrap to which normal data is finally written, the degradation should be mitigated by a certain distributed manner; (iv) positioning to the ABF wrap takes time; (v) the amount of data to be written to the ABF wrap and the amount of data to be written through the operation of Recursive Write which writes back from the ABF wrap from the section after the file mark of the original wrap are not more than the amount equal to the buffer size mounted in the tape drive for one round of RABF (2 gigabytes); (vi) data in the order of 130 gigabytes (GB) can be written on the two wraps used in ABF including both forward and backward directions; (vii) accordingly, data written by RABF to a wrap distant by two or more wraps (wrap that follows with respect to the guard wrap) is not overwritten by the writing to the current wrap at the time of the Recursive Write; and/or (viii) once the data is written back by the Recursive Write, the data on the ABF wrap becomes unnecessary.

Some embodiments of the present invention may include one, or more, of the following features, characteristics and/or advantages: (i) the wrap to be used as an ABF wrap is dynamically changed within the same band; (ii) on the forward direction wrap, the writing of data is performed to a wrap that is distant by the number of wraps corresponding to the number of the guard wraps (for example, position two wraps away); (iii) on the backward direction wrap, the writing of data is performed to the position that is the closest on condition that ABF#1 is not overwritten (in a normal write operation, the wrap area where the data is written in the opposite direction is used); (iv) when the writing of data is to be performed to the third wrap from the inside, the innermost wrap is used in the same manner as in the conventional RABF; (v) when writing is performed to the two inside wraps (a total of four wraps in both directions), outer two wraps of another data band are used as the ABF wraps; (vi) because the RABF writes are distributed to all the wraps, the degradation of any single given wrap is reduced; and/or (vii) the movement distance to and from the ABF wrap can be reduced.

Figure 9:
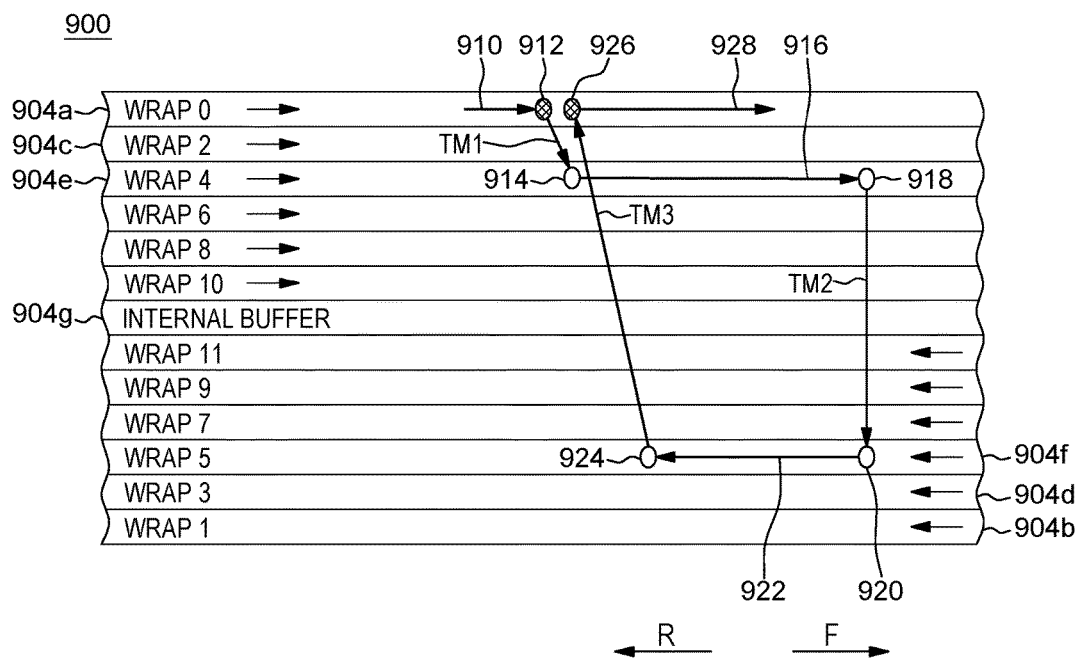
FIG. 9 is a diagram view of a tape medium performing a second embodiment of a method according to the present invention.

An embodiment of the present invention is described in FIG. 9, including a tape medium 900 with the following details: (i) a data writing operation 910 begins on wrap 0 904a; (ii) when a buffer flush condition 912 is detected at time TM1, select temp track sub-mod 312 (not shown) selects wrap 4 904e as a temporary track for buffer flush data based on wrap 4 904e being the second closest wrap to the current wrap 0 904a with the same direction (forward) as the current wrap, leaving wrap 2 904c as a guard wrap; (iii) data operations proceed to 914 where buffer flush operation 916 begins on wrap 4 904e in the forward direction; (iv) once reaching the end of wrap 4 904e in the forward direction at 918 at time TM2, responsive to determining the buffer flush operation as incomplete, select temp track sub-mod 312 (not shown) selects wrap 5 904f as a temporary track for continuing the buffer flush operation based on wrap 5 904f being a reverse direction wrap bearing the same relative positioning from wrap 1 904b that wrap 4 904e has from wrap 0 904a, mirroring wrap 4 904e across an axis of internal buffer 904g and reserving 904d as a guard wrap; (v) buffer flush operation 916 proceeds to wrap 5 904f in the reverse direction beginning at 920 to continue buffer flush operation 916 into buffer flush operation 922; (vi) buffer flush operation 922 continues on wrap 5 904f in the reverse direction until 924 at time TM3, where an end of the buffer flush condition is detected; and (vii) the data writing operation 910 is completed beginning at 926 on wrap 0 904a by recursive writing operation 928 using buffer flush data from wrap 4 904e and wrap 5 904f.

Figure 10:
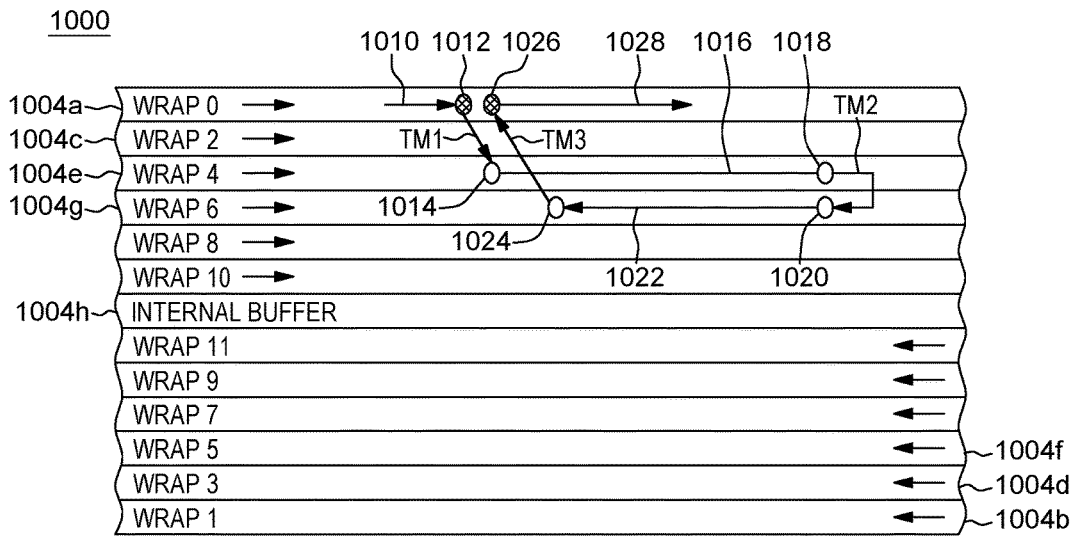
FIG. 10 is a diagram view of a tape medium performing a third embodiment of a method according to the present invention.

Another embodiment of the present invention is described in FIG. 10, including a tape medium 1000 with the following details: (i) a data writing operation 1010 begins on wrap 0 1004a; (ii) when a buffer flush condition 1012 is detected at time TM1, select temp track sub-mod 312 (not shown) selects wrap 4 1004e as a temporary track for buffer flush data based on wrap 4 1004e being the second closest wrap to the current wrap 0 1004a with the same direction (forward) as the current wrap, leaving wrap 2 1004c as a guard wrap; (iii) data operations proceed to 1014 where buffer flush operation 1016 begins on wrap 4 1004e in the forward direction; (iv) once reaching the end of wrap 4 1004e in the forward direction at 1018 at time TM2, responsive to determining the buffer flush operation as incomplete, select temp track sub-mod 312 (not shown) selects wrap 6 1004g as a temporary track for continuing the buffer flush operation based on being the closest wrap to the previously used temporary track wrap 4 1004e between the wrap 0 1004a, which was the wrap used prior to detecting the buffer flush condition, and the internal buffer 1004h; (v) buffer flush operation 1016 proceeds to wrap 6 1004g in the reverse direction beginning at 1020 to continue buffer flush operation 1016 into buffer flush operation 1022; (vi) buffer flush operation 1022 continues on wrap 6 1004g in the reverse direction until 1024 at time TM3, where an end of the buffer flush condition is detected; (vii) the data writing operation 1010 is completed beginning at 1026 on wrap 0 1004a by recursive writing operation 1026 using buffer flush data from wrap 4 1004e and wrap 6 1004g; and (viii) wrap 1 1004b, wrap 3 1004d and wrap 5 1004f are not used because temporary tracks are selected based on proximity to the current wrap regardless of the assigned direction of the temporary track.

Figure 11:
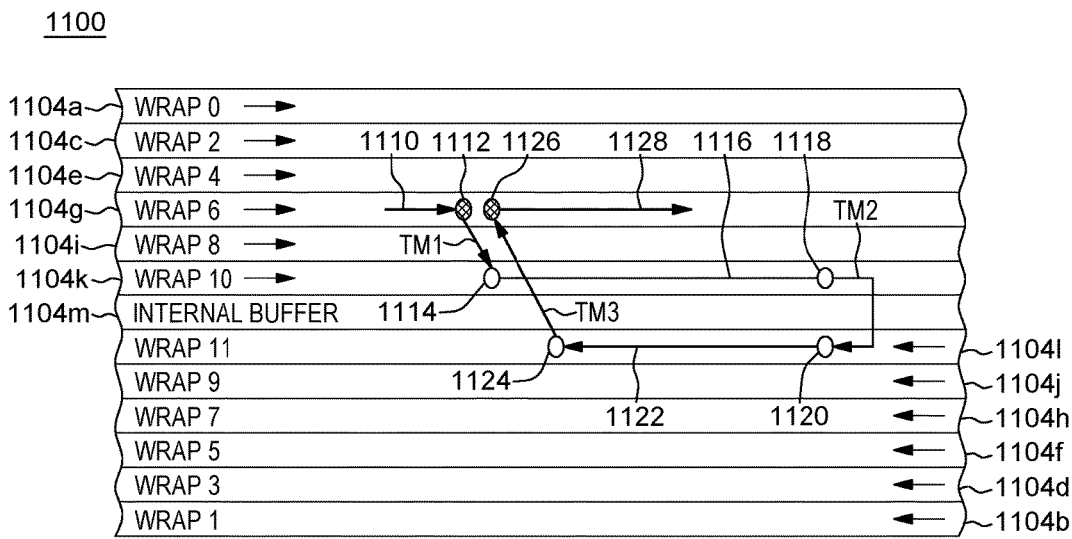
FIG. 11 is a diagram view of a tape medium performing a fourth embodiment of a method according to the present invention.

Another embodiment of the present invention is described in FIG. 11, including a tape medium 1100 with the following details: (i) where data has already been written on wrap 0 1104a through wrap 5 1104f, including wrap 1 1104b and wrap 3 1104d, a data writing operation 1110 begins on wrap 6 1104g in the forward direction; (ii) when a buffer flush condition 1112 is detected at time TM1, select temp track sub-mod 312 (not shown) selects wrap 10 1104k as a temporary track for buffer flush data based on wrap 10 being the second closest unused wrap in the forward direction that is neither internal buffer 1104m or a reverse direction wrap, such that wrap 8 1104i is reserved as a guard wrap; (iii) data operations proceed to 1114 where buffer flush operation 1116 begins on wrap 10 1104k in the forward direction; (iv) once reaching the end of wrap 10 1104k in the forward direction at 1118 at time TM2, responsive to determining the buffer flush operation as incomplete, select temp track sub-mod 312 (not shown) selects wrap 11 1104l as a temporary track for continuing the buffer flush operation based on wrap 1 1104b through wrap 9 1104j already being used; (v) buffer flush operation 1116 proceeds to wrap 11 1104l in the reverse direction beginning at 1120 to continue buffer flush operation 1116 into buffer flush operation 1122; (vi) buffer flush operation 1122 continues on wrap 11 1104l in the reverse direction until 1124 at time TM3, where an end of the buffer flush condition is detected; and (vii) the data writing operation 1110 is completed beginning at 1126 on wrap 6 1104g by recursive writing operation 1128 using buffer flush data from wrap 10 1104k and wrap 11 1104l.

Figure 12:
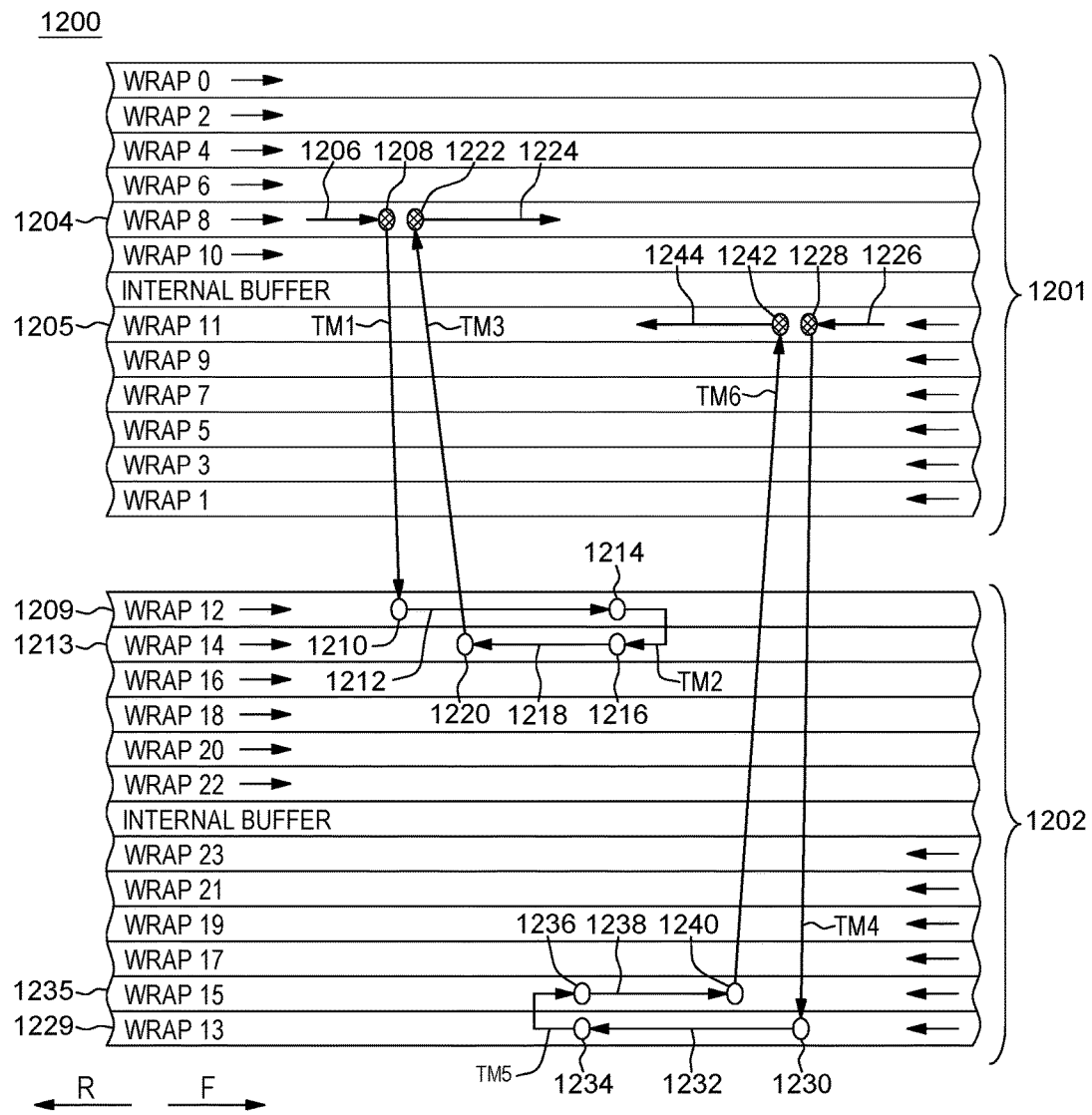
FIG. 12 is a diagram view of a tape medium performing a fifth embodiment of a method according to the present invention.

Another embodiment of the present invention is described in FIG. 12, including a tape medium 1200 with the following details: (i) where a tape medium includes at least two data bands, data band 0 1201 and data band 1 1202, a first data writing operation 1206 begins in a forward direction on wrap 8 1204; (ii) at TM1 and 1208, a first buffer flush condition is detected and select temp track sub-mod 312 (not shown) selects wrap 12 1209 on data band 1 1202 based, at least in part, on wrap 12 1209 not being a wrap on data band 0 1201 and first data writing operation 1206 and/or second data writing operation 1226 occurring on wraps within a distance of two wraps in the transverse direction from the internal buffer of data band 0 1201; (iii) first buffer flushing operation 1212 begins in the forward direction at 1210 on wrap 12 1209 of data band 1 1202; (iv) at 1214, it is determined that the remainder of buffer data to be flushed, if written in the reverse direction, would place a relative longitudinal position of the tape medium and a tape head closer than if writing continues in the forward direction on wrap 12 1209, and wrap 14 1213 is selected for continuation of first buffer flushing operation 1212 in the reverse direction based, at least in part, on the proximity of wrap 14 1213 to wrap 12 1209; (v) at TM2, first buffer flushing operation 1212 continues in the reverse direction, labeled as 1218, beginning at 1216; (vi) at TM3 and 1220, the first buffer flushing operation 1212 is completed and a first recursive writing operation 1224 is begun at 1222 using data from the first buffer flushing operation at 1212 and 1218; (vii) a second data writing operation 1226 on track 11 1205 is occurring in the reverse direction; (viii) at 1228 and TM4 a second buffer flush condition is detected and select temp track sub-mod 312 (not shown) selects wrap 13 1229 on data band 1 1202 based, at least in part, on wrap 13 1229 not being a wrap on data band 0 1201 and first data writing operation 1206 and/or second data writing operation 1226 occurring on wraps within a distance of two wraps in the transverse direction from the internal buffer of data band 0 1201; (ix) at 1230 a second buffer flushing operation 1232 begins in the reverse direction; (x) at 1234, it is determined that the remainder of buffer data to be flushed, if written in the forward direction, would place a relative longitudinal position of the tape medium and the tape head closer than if writing continues in the reverse direction on wrap 13 1229, and wrap 15 1235 is selected for continuation of second buffer flushing operation 1232 in the forward direction based, at least in part, on the proximity of wrap 15 1235 to wrap 13 1229; (xi) at TMS, second buffer flushing operation 1232 continues in the forward direction, labeled as 1238, beginning at 1236; and (xii) at TM6 and 1240, the second buffer flushing operation 1232 is completed and a second recursive writing operation 1244 is begun at 1242 on track 11 1205 using data from the second buffer flushing operation at 1232 and 1238.

Figure 13:
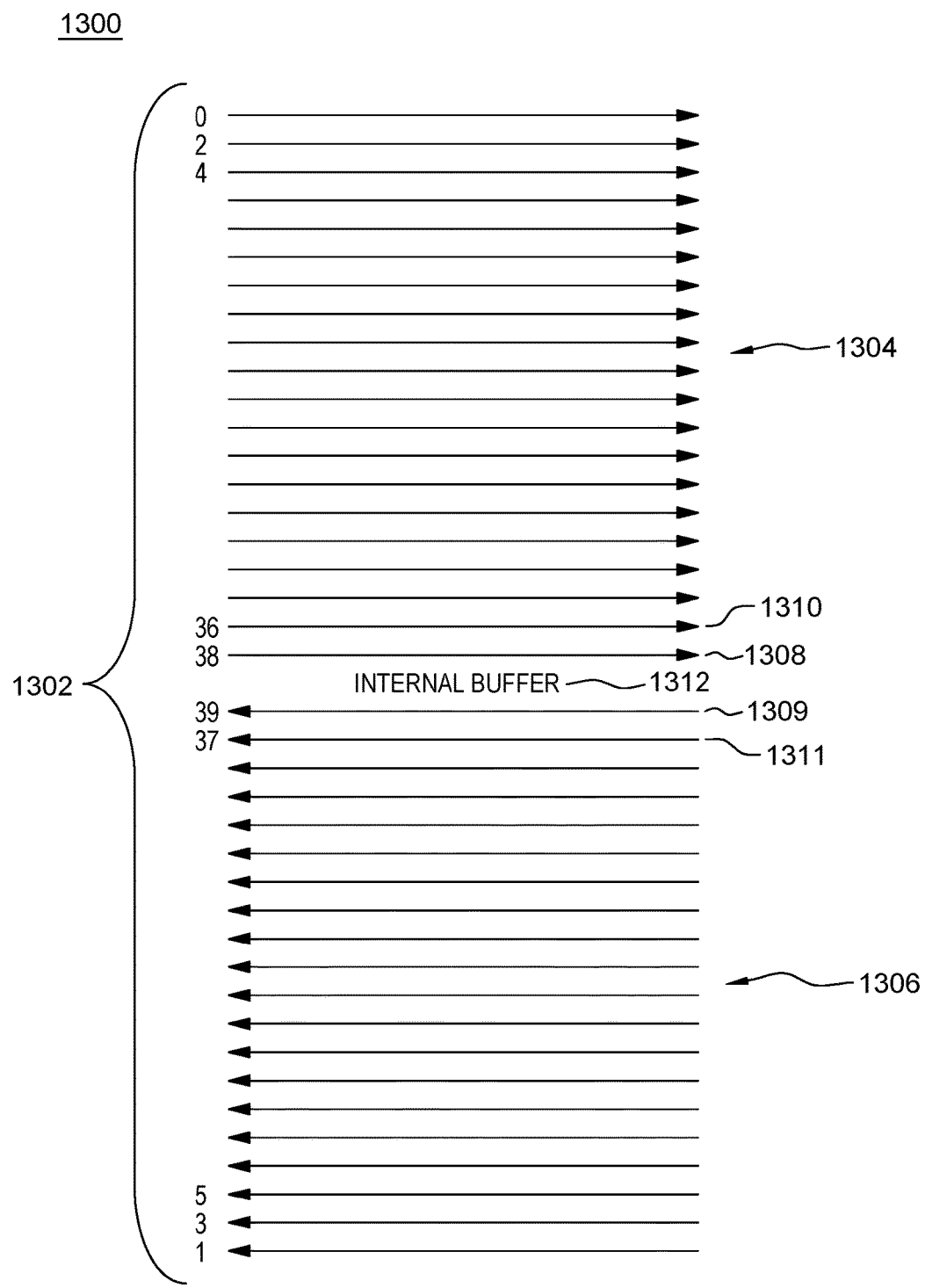
FIG. 13 is another diagram view of a tape medium helpful in explaining method(s) according to the present invention.

FIG. 13 depicts a legacy accumulating backhitchless flush (ABF) wrap allocation implementation including a tape medium 1300 with the following details: (i) a data band 1302 including forty wraps, wrap 0 through wrap 39, where even numbered wraps 1304 are assigned a forward direction and odd numbered wraps 1306 are assigned a reverse direction; (ii) wrap 38 1308 and wrap 39 1309 are used as ABF wraps; (iii) wrap 36 1310 and wrap 37 1311 are reserved as guard wraps relating to failure of a recursive writing operation; (iv) even numbered wraps 1304, excluding wraps 36 and 38 use wrap 38 1308 and wrap 39 1309 as a first and second ABF wrap, respectively; (v) odd numbered wraps 1306, excluding wraps 37 and 39 use wrap 39 1309 and wrap 38 1308 as the first and second ABF wrap, respectively; (vi) wraps 36 1310, 37 1311, 38 1308 and 391309 wrap use wraps on different data bands as their first and second ABF wraps; and (vii) an internal buffer 1312 located between wraps 38 1308 and 39 1309, separating wraps 1304 and 1306.

Figure 14:
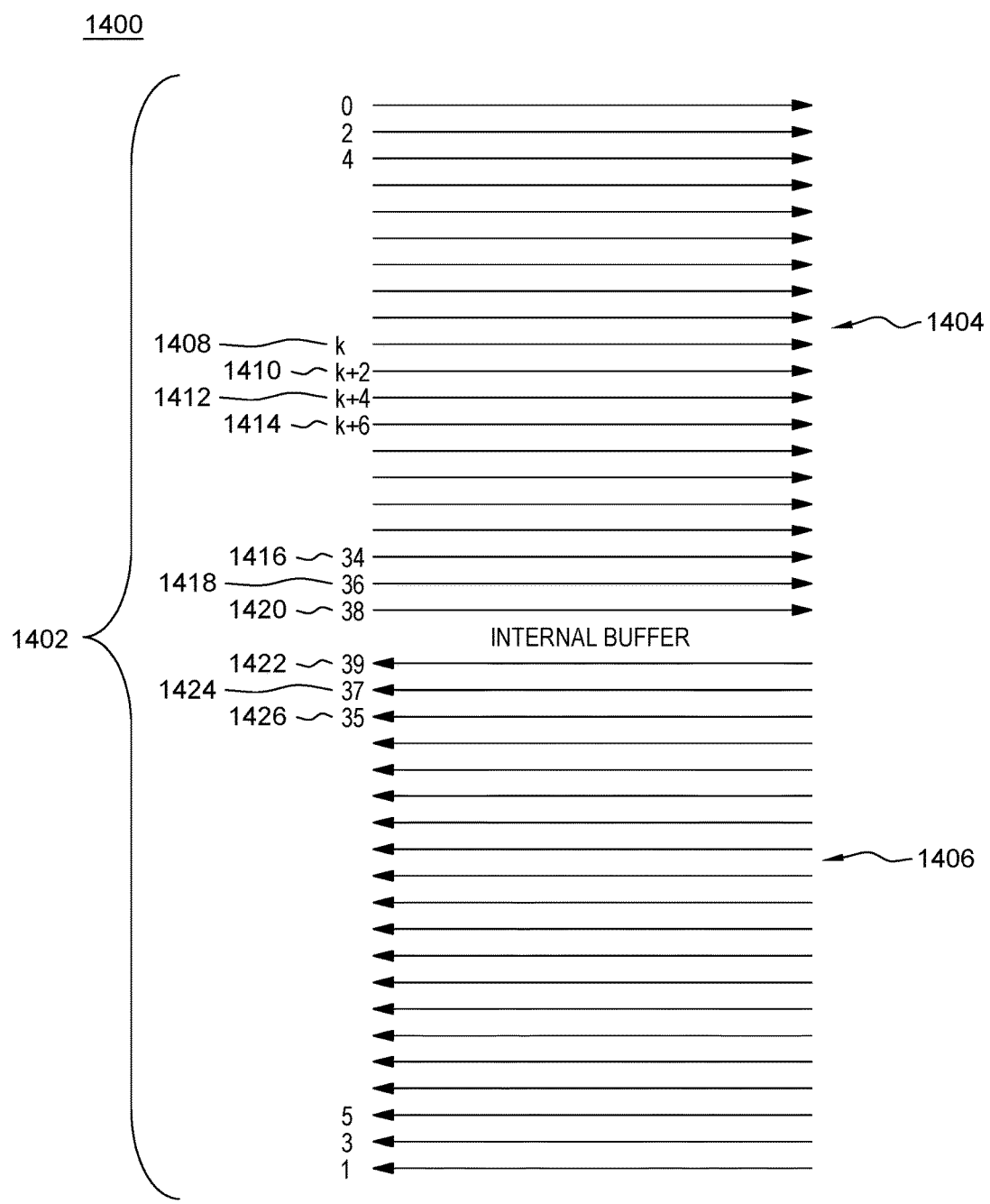
FIG. 14 is another diagram view of a tape medium helpful in explaining method(s) according to the present invention.

FIG. 14 depicts an embodiment of the present invention as it relates to an accumulating backhitchless flush (ABF) wrap allocation implementation of a tape medium 1400 including: (i) a state of the art tape drive TS1150 has 40 wraps in each data band, of which twenty wraps are assigned a forward direction and twenty wraps are assigned a backwards (reverse) direction; (ii) a data band 1402 where even numbered wraps 1404 are assigned a forward direction and odd numbered wraps 1406 are assigned a reverse direction; (iii) ABF wraps are determined from the nearest accessible wraps dynamically; (iv) a guard wrap is needed between a current wrap k in the event of a recursive write fail event; (v) no guard wrap is needed between a first ABF wrap and a second ABF wrap; (vi) when the current wrap k, where k is the wrap number, is a wrap less than 34, as depicted as 1408, a wrap that is k+2, as depicted as 1410, is used as a guard wrap for ABF allocation purposes, k+4, as depicted as 1412, is used as the first ABF wrap, and k+6, as depicted as 1414, is used as the second ABF wrap; (vii) if the current wrap k is a wrap equal to 34 1416 or wrap 35 1426, such as wrap 34 as depicted as 1416, the second ABF wrap is instead allocated from the closest wrap in the opposite direction from wrap k, as depicted as wrap 39 1422, with wrap 38 1420 used as the first ABF wrap and wrap 36 1418 used as the guard wrap (if wrap 35 1426 was the current wrap, wrap 37 1424 would be used as the guard wrap, wrap 39 1422 used as the first ABF wrap, and wrap 38 1420 used as the second ABF wrap); and (viii) wrap 36 1418, wrap 38 1420, wrap 37 1424 and wrap 39 1422 use wraps on different data bands as the first and second ABF wraps.

Some embodiments of the present invention may include one, or more, of the following features, characteristics and/or advantages: (i) use a writable wrap that is the second closest to the wrap to which writing is being currently performed (the wrap 4 904e in FIG. 9) simply for ABF#1, reserving a guard wrap in between; (ii) however, since RABF involves writing to the backward direction wrap (ABF#2) as well, movement to the wrap 5 (wrap 5 904f in FIG. 9) occurs; (iii) in accordance with the proposed scheme, as illustrated in FIG. 10, ABF#1 uses the writable wrap (the wrap 4 1004e in FIG. 10) the next closest to the wrap to which the writing is being performed; (iv) in addition, the wrap residing at the position which is used in the same direction as that in which the writing normally is performed and which is the second closest (to the wrap to which the writing is being performed) to/from which overwriting does not occur with respect to each other is used for ABF#2 (the wrap 6 1004g in FIG. 10); (v) by virtue of this scheme, it is made possible to further decrease the movement distance in the width direction of the head compared with existing schemes; (vi) as illustrated in FIG. 11, when writing takes place to the third wraps from the inside (the wraps 6 1104g and 7 1104h in FIG. 11), the wraps that have been used by the conventional RABF are used as the ABF wraps; (vii) when writing of data occurs to the two inside wraps as illustrated in FIG. 12 (in this example, the wraps 8 1204 and 11 1205), the outside two wraps on another data partition are used as ABF wraps in the same manner as in the conventional RABF; and/or (viii) these wraps are never used in RABF in writing of data within the same data band.

Some embodiments of the present invention may include one, or more, of the following features, characteristics and/or advantages: (i) in accordance with the conventional scheme, when RABF occurs in the wraps of the wrap 0 to wrap n−5, the wrap n−2 and the wrap n−1 are used by RABF; (ii) in accordance with the proposed scheme, when RABF occurs in the wrap k and the wrap k+1, then the wrap k+4 and the wrap k+5 are used by RABF; (iii) when they are compared with each other in terms of the RABF occurring in the wraps 0 to n−5, the probability of RABF writes occurring on the same wrap is reduced by the proposed scheme to 2/(n−4) of the conventional scheme; (iv) for example, in the case of a TS1150 format tape having 40 wraps per data band, the number of RABF writes to a particular wrap is reduced to as low as 1/18; (v) when a full write is carried out for one TS1150 tape, the number of times of writing to the fixed ABF wrap is 41 including the normal writes and RABF writes in the conventional cases; and/or (vi) in contrast, when the proposed scheme is introduced, only three times of writing operations are necessary for each wrap.

Some embodiments of the present invention may include one, or more, of the following features, characteristics and/or advantages: (i) in addition to above effect of mitigation of concentration of writes to a particular wrap in a distributed manner, an accompanying effect of the proposed scheme is reduction in the movement distance in the width direction of the head; (ii) a state of the art example tape drive TS1150 has 40 wraps per data band; (iii) FIG. 13 illustrates a conventional scheme; (iv) in the conventional RABF, the innermost two wraps are fixedly used for ABF and the next two wraps thereof are fixedly used as the guard wraps; and (v) the distance of movement to be made in the width direction for one round of RABF is expressed as follows, where "$D_{average}$" is the average movement distance in RABF, "n" is the number of wraps per data band, "$d_{TP}$" is the distance between the wraps (track pitch), and "$d_{IB}$" is the internal buffer width.

Some embodiments of the present invention recognize that the vertical distance a tape head travels during state of the art RABF operations can be represented by the following equation:

$$D_{average} = \frac{\sum_{i=0}^{n-5}(n-(i-i\ \%2))d_{TP} + 2d_{IB}}{n-4}$$

When applying the above equation to a TS1150 tape drive, where n=40, the average distance traveled equals 23 wraps+2 internal buffers. A general case example of the above equation: when engaging RABF operations on a TS1150 tape drive while using wrap i for n wraps per data band: (i) move [40−[i−i %2]]/2−1 wraps down to go to ABF#1; (ii) move 1 wrap and an internal buffer down to go to ABF#2 wrap; (iii) move an internal buffer and [40−[i−i %2]]/2 wraps up to go back to wrap i; and (iv) total 40−[i−i %2] wraps+2 internal buffers. In accordance with the conventional scheme, it is necessary to make movement in the width direction of the tape of 23 $d_{TP}$+2 Dm on average for one round of RABF write in the case of TS1150 with 40 wraps per data band.

A specific example of the above equation, as applied to a TS1150 tape drive: when engaging RABF operations while using wrap i=0: (i) move 19 wraps down to go to ABF#1 wrap; (ii) move 1 wrap and an internal buffer down to go to ABF#2 wrap; (iii) move an internal buffer and 20 wraps up to go back to wrap 0; and (iv) total wraps traveled=40 wraps+two internal buffers.

Another example of the above application when applied to a TS1150 tape drive: engaging RABF operations while using wrap i=34: (a) move 2 wraps down to go to ABF#1 wrap; (b) move 1 wrap and an internal buffer down to go to ABF#2 wrap; (c) move an internal buffer and 3 wraps up to go back to wrap 34; and (d) total wraps traveled=6 wraps+two internal buffers.

Some embodiments of the present invention may include one, or more, of the following features, characteristics and/or advantages: (i) in accordance with the proposed ABF, writing of data is performed to the closest wrap with the guard wrap residing in between as illustrated in FIG. 14; (ii) accordingly, in normal cases, when RABF is started while the writing takes place for the wrap k in FIG. 14, the wrap k+4 is used for ABF#1 and the wrap k+6 is used for ABF#2; (iii) with regard to ABF#2, writing takes place in a direction opposite to the normally used direction; (iv) herein, the wrap k+2 is reserved as the guard wrap; (v) however, if the wrap with which RABF is started in FIG. 14 is n−5 or n−6, then ABF#2 uses the area of the wrap of the reverse direction; (vi) for example, when RABF is entered while writing is performed to the wrap 34, the wrap 38 is used in the same manner as [1] for ABF#1; (vii) meanwhile, ABF#2 uses the reverse direction wrap 39; and/or (viii) wrap 37 is reserved as the guard wrap in addition to the wrap 36 to respond to recovery at the time of recursive write fail.

In accordance with the previous paragraph, the distance of movement to be made in the width direction in one round of RABF operations in some embodiments of the present invention can be obtained from the following equation:

$$D_{average} = 6d_{TP} + \frac{2d_{IB}}{n-4}$$

Some example applications of the above equation will now be discussed. When n equals 40 in the example of a TS1150 tape drive, the average distance in the width direction traveled during one round of RABF operations is 6 wraps+ 1/18 internal buffers, almost one quarter of the number of wraps crossed during state of the art RABF operations (17 wraps+1.94 internal buffers smaller). Based on the location of internal buffers between when wraps for a data band switch direction, the equation covers two different cases covering operations on all of the available data bands in a TS1150 tape drive:
When RABF while using wrap k for n wraps per data band
in case of 0≤k<n−6, total 6 wraps
in case of n−6≤k<n−4, total 6 wraps+2 internal buffers In accordance with some embodiments of the present invention and the equations in the previous paragraph, when performing some embodiments of the present invention with a TS1150 tape drive on wraps 0 through 33: (i) move 2 wraps down to go to ABF#1 wrap; (ii) move 1 wrap down to go to ABF#2 wrap; and (iii) move 3 wraps up to return to the wrap in use, traveling a total distance in width of 6 wraps.

In accordance with some embodiments of the present invention and the equations in the previous paragraph, when performing some embodiments of the present invention with a TS1150 tape drive on wraps 34 or 35: (i) move 2 wraps down to go to ABF#1 wrap; (ii) move 1 wrap and 1 internal buffer to go down to ABF#2 wrap; and (iii) move 3 wraps and 1 internal buffer to return to the wrap in use, travelling a total distance in width of 6 wraps and 2 internal buffers.

A method according to one embodiment of the present invention includes the following steps: (i) receiving a data write command to write data in a buffer of a tape drive onto a tape; (ii) dynamically determining a data wrap to which the data in the buffer is written, the dynamically determined data wrap being different from a data wrap used in reading and/or writing until reception of the command; and (iii) writing the data in the buffer to the dynamically determined data wrap.

The method of the preceding paragraph may include one or more of the following features: (i) the data wrap to be dynamically determined is a data wrap that is distant from the data wrap used in the reading and/or writing until the reception of the command with a guard wrap residing in between; (ii) after the writing the data to the dynamically determined data wrap, data that is identical to the data written to the dynamically determined data wrap is written to the data wrap used in the reading and/or writing until the reception of the command; (iii) an innermost data wrap is used as the data wrap to which the data in the buffer is written in response to the data wrap used in the reading and/or writing until the reception of the command being a third wrap from an inside of a data band; (iv) a data wrap of another data band is used as the data wrap onto which the data in the buffer is written when the data wrap used in the reading and/or writing until the reception of the command is a second data wrap or an innermost data wrap from an inside of a data band; and/or (v) the data write command to write the data in the buffer of the tape drive onto the tape is a Small Computer System Interface (SCSI) Write File Mark command.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Permanent/permanent location: a location where data is written after any flush operations and associated writing operations have occurred; this data may later be deleted, revised and/or rewritten upon commands related to data storage, but is not deleted or rewritten due to flush/recursive writing operations.

Temporary/temporary location: a location where data is written as part of a buffer flush operation, but from which temporary location the data will be read and rewritten to its permanent location as part of a recursive writing operation.

What is claimed is:

1. A computer program product comprising:
    a tape drive system including:
        a buffer memory,
        tape drive control logic,
        a tape recording head for writing to-be-written data,
        an elongated tape medium defining a transverse direction, with the tape medium being organized into a plurality of writing tracks adapted to have recorded thereon to-be-written data as written data,
        a machine readable storage device, and
        computer code stored on the machine readable storage device, with the computer code including instructions for causing a processor(s) set to perform operations including the following:
            receiving, by a buffer memory, a stream of to-be-written data,
            receiving, by the tape drive control logic, an identity of a first writing track of the plurality of writing tracks, with the first writing track being a track where to-be-written data is currently being permanently written as written data from the buffer memory to the tape medium by the tape recording head,
            receiving, by the tape drive control logic, flush indication data indicating that a flush of the buffer memory needs to be performed,
            responsive to the receipt of the buffer flush indication data, determining a second writing track of the plurality of writing tracks, with the second writing track being a writing track to be used in flushing to-be-written data from the buffer memory, and with the determination of the second writing being based, at least in part, upon a relative transverse direction proximity between the first writing track and the second writing track, and
            flushing at least a portion of the buffer memory by writing to-be-written data from the buffer memory as temporary written data to the second writing track.

2. The product of claim 1 wherein the computer code further includes instructions for causing the processor(s) set to perform the following operations:
    concurrent with flushing at least a portion of the buffer memory, receiving additional data from the stream of to-be-written data;
    accumulating the additional data in the buffer memory; and
    responsive to accumulating a predetermined size of data in the buffer, writing the accumulated data to the first writing track.

3. The product of claim 1 wherein the recursively re-written data is data required to complete a data segment stored as permanent data on the first writing track.

4. The product of claim 1 wherein:
    the tape drive system is an RABF (recursively accumulating backhitchless flush) type tape drive system;
    the plurality of data tracks are data wraps, with each wrap of the plurality of data wraps is designed to be permanently written in one of: a forward direction or a reverse direction;
    the plurality of data wraps are divided into a plurality of sub-sets called data bands; and the determination of the second writing track is further based, at least in part, upon a constraint the second writing track must be in the same data band as the first writing track.

5. The product of claim 4 wherein:
the tape recording head is larger, in the transverse direction, than a transverse width of a data wrap; and
the tape medium further includes a plurality of guard wraps to prevent the tape recording head from compromising data on data tracks transversely adjacent to a data track currently being written.

6. The product of claim 5 wherein a first guard wrap of the plurality of guard wraps is located between the first writing track and the second writing track.

7. The product of claim 1 wherein:
half of the plurality of writing tracks are assigned for writing in the forward direction, with the other half assigned for writing in the reverse direction; and
the determination of the second writing track is further based, at least in part, on the assigned direction of the second track relative to a longitudinal direction of tape motion at a time when the flush indication data is received.

8. A computer program product comprising:
a tape drive system including:
a buffer memory,
tape drive control logic,
a tape recording head for writing to-be-written data,
an elongated tape medium defining a transverse direction, with the tape medium being organized into a plurality of writing tracks adapted to have recorded thereon to-be-written data as written data,
a machine readable storage device, and
computer code stored on the machine readable storage device, with the computer code including instructions for causing a processor(s) set to perform operations including the following:
receiving, by a buffer memory, a stream of to-be-written data,
receiving, by the tape drive control logic, an identity of a first writing track of the plurality of writing tracks, with the first writing track being a track where to-be-written data is currently being permanently written as written data from the buffer memory to the tape medium by the tape recording head,
receiving, by the tape drive control logic, flush indication data indicating that a flush of the buffer memory needs to be performed,
responsive to the receipt of the buffer flush indication data, determining a second writing track of the plurality of writing tracks, with the second writing track being a writing track to be used in flushing to-be-written data from the buffer memory, and with the determination of the second writing being based, at least in part, upon a degree of tape degradation of the plurality of writing tracks, and
flushing at least a portion of the buffer memory by writing to-be-written data from the buffer memory as temporary written data to the second writing track.

9. The product of claim 8 wherein the computer code further includes instructions for causing the processor(s) set to perform the following operations:
concurrent with flushing at least a portion of the buffer memory, receiving additional data from the stream of to-be-written data;
accumulating the additional data in the buffer memory; and
responsive to accumulating a predetermined size of data in the buffer, writing the accumulated data to the first writing track.

10. The product of claim 8 wherein the recursively re-written data is data required to complete a data segment stored as permanent data on the first writing track.

11. The product of claim 8 wherein:
the tape drive system is an RABF (recursively accumulating backhitchless flush) type tape drive system;
the plurality of data tracks are data wraps, with each wrap of the plurality of data wraps is designed to be permanently written in one of: a forward direction or a reverse direction;
the plurality of data wraps are divided into a plurality of sub-sets called data bands; and
the determination of the second writing track is further based, at least in part, upon a constraint the second writing track must be in the same data band as the first writing track.

12. The product of claim 11 wherein:
the tape recording head is larger, in the transverse direction, than a transverse width of a data wrap; and
the tape medium further includes a plurality of guard wraps to prevent the tape recording head from compromising data on data tracks transversely adjacent to a data track currently being written.

13. The product of claim 12 wherein a first guard wrap of the plurality of guard wraps is located between the first writing track and the second writing track.

14. A computer program product comprising:
a tape drive system including:
a buffer memory,
tape drive control logic,
a tape recording head for writing to-be-written data,
an elongated tape medium defining a transverse direction, with the tape medium being organized into a plurality of writing tracks adapted to have recorded thereon to-be-written data as written data,
a machine readable storage device, and
computer code stored on the machine readable storage device, with the computer code including instructions for causing a processor(s) set to perform operations including the following:
receiving, by a buffer memory, a stream of to-be-written data,
receiving, by the tape drive control logic, an identity of a first writing track of the plurality of writing tracks, with the first writing track being a track where to-be-written data is currently being permanently written as written data from the buffer memory to the tape medium by the tape recording head,
receiving, by the tape drive control logic, flush indication data indicating that a flush of the buffer memory needs to be performed,
responsive to the receipt of the buffer flush indication data, determining a second writing track of the plurality of writing tracks, with the second writing track being a writing track to be used in flushing to-be-written data from the buffer memory, and with the determination of the second writing being based, at least in part, upon: (i) a relative transverse direction proximity between the first writing track and the second writing track, and (ii) a degree of tape degradation of the plurality of writing tracks, and flushing at least a portion of the buffer memory by writing to-be-written data from the buffer memory as temporary written data to the second writing track.

15. The product of claim 14 wherein the computer code further includes instructions for causing the processor(s) set to perform the following operations:

concurrent with flushing at least a portion of the buffer memory, receiving additional data from the stream of to-be-written data;

accumulating the additional data in the buffer memory; and responsive to accumulating a predetermined size of data in the buffer, writing the accumulated data to the first writing track.

16. The product of claim 14 wherein the recursively re-written data is data required to complete a data segment stored as permanent data on the first writing track.

17. The product of claim 14 wherein:

the tape drive system is an RABF (recursively accumulating backhitchless flush) type tape drive system;

the plurality of data tracks are data wraps, with each wrap of the plurality of data wraps is designed to be permanently written in one of: a forward direction or a reverse direction;

the plurality of data wraps are divided into a plurality of sub-sets called data bands; and the determination of the second writing track is further based, at least in part, upon a constraint the second writing track must be in the same data band as the first writing track.

18. The product of claim 17 wherein:

the tape recording head is larger, in the transverse direction, than a transverse width of a data wrap; and the tape medium further includes a plurality of guard wraps to prevent the tape recording head from compromising data on data tracks transversely adjacent to a data track currently being written.

19. The product of claim 18 wherein a first guard wrap of the plurality of guard wraps is located between the first writing track and the second writing track.

20. The product of claim 14 wherein:

half of the plurality of writing tracks are assigned for writing in the forward direction, with the other half assigned for writing in the reverse direction; and the determination of the second writing track is further based, at least in part, on the assigned direction of the second track relative to a longitudinal direction of tape motion at a time when the flush indication data is received.

* * * * *